United States Patent [19]

Watanabe et al.

[11] Patent Number: 5,335,875
[45] Date of Patent: Aug. 9, 1994

[54] TAPE CASSETTE STRUCTURE

[75] Inventors: Masaru Watanabe, Nishinomiya; Tousaku Nishiyama, Katano, both of Japan

[73] Assignee: Matsushita Electric Industrial Co., Ltd., Osaka, Japan

[21] Appl. No.: 988,693

[22] Filed: Dec. 10, 1992

[51] Int. Cl.⁵ ............................................. G11B 15/04
[52] U.S. Cl. ...................................... 242/341; 242/347
[58] Field of Search ..................... 242/197, 198, 199; 360/132

[56] References Cited

U.S. PATENT DOCUMENTS

| | | | |
|---|---|---|---|
| 3,826,489 | 7/1974 | Watkins, Jr. | 242/199 X |
| 4,044,386 | 8/1977 | Satou et al. | 360/132 X |
| 4,452,408 | 6/1984 | Sasaki | 242/199 |
| 4,460,930 | 7/1984 | Takahashi | 360/132 X |
| 4,665,456 | 5/1987 | Ahlberg et al. | 360/132 |
| 4,734,812 | 3/1988 | Tanaka et al. | 242/199 X |
| 4,769,732 | 9/1988 | Tanaka | 242/199 X |
| 4,844,378 | 7/1989 | Oishi | 360/132 X |
| 4,964,588 | 10/1990 | Hoffrichter et al. | 242/199 |
| 5,087,998 | 2/1992 | Oishi | 360/132 |
| 5,097,377 | 3/1992 | Hardisky | 360/132 |
| 5,132,862 | 7/1992 | Heveron et al. | 360/132 |
| 5,189,582 | 2/1993 | Hanson et al. | 360/132 |
| 5,206,781 | 4/1993 | Yanaka | 242/198 X |
| 5,218,502 | 6/1993 | Tanaka et al. | 242/199 X |

FOREIGN PATENT DOCUMENTS

| | | | |
|---|---|---|---|
| 0150601 | 8/1985 | European Pat. Off. | 360/132 |
| 2025899 | 1/1980 | United Kingdom | 360/132 |

Primary Examiner—Daniel P. Stodola
Assistant Examiner—John P. Darling
Attorney, Agent, or Firm—Wenderoth, Lind & Ponack

[57] ABSTRACT

A tape cassette for accommodating a magnetic recording tape comprises a casing including first and second major walls opposite to each other and spaced a distance corresponding to the width of a length of magnetic tape, a pair of opposite end walls, and front and rear walls opposite to each other, all assembled together to render the casing as a whole to represent a generally rectangular box-like configuration. Art erroneous erasure preventing member is accommodated within a detection hole, defined in the rear wall, for selective movement between retracted and projected positions in a direction substantially perpendicular to the rear wall. The erasure preventing member has an outer surface which, when in the projected position, closes the detection hole while lying flush with an outer surface of the rear wall, indicating the condition in which the magnetic tape contained in the tape cassette is available for information recording or erasure. On the other hand, when the erasure preventing member is moved to the retracted position with the outer surface thereof consequently set back inwardly from the rear wall, the tape cassette is held in the condition in which neither information recording nor information erasure can be accomplished on or from the length of magnetic tape contained therein.

9 Claims, 3 Drawing Sheets

TAPE CASSETTE STRUCTURE

BACKGROUND OF THE INVENTION

1. Field of the Invention

The present invention generally relates to a tape cassette for accommodating a length of magnetic tape for the recording or reproduction of information thereon or therefrom, respectively, and, more particularly, to the tape cassette having an improved erasure preventive element.

2. Description of the Prior Art

Commercially available tape cassettes containing a reeled magnetic tape for the-recording or reproduction of analog audio signals have a basic structure comprising a generally rectangular box-like casing made up of a pair of casing halves, a length of magnetic tape, a pair of hubs to which respective opposite ends of the length of magnetic tape are secured, a plurality of guide rollers disposed along a path of travel of the length of magnetic tape from one hub to the other, shields, pads and lubricant sheets.

For avoiding any possible erroneous or premature erasure of information recorded on the length of magnetic tape, the tape cassette has a pair of breakable erasure preventive pawls 2 formed integrally with the respective casing halves 1, only one of which is shown in FIG. 6. Specifically, when one or both of the erasure preventive pawls 2 are cut away, recesses 3 defined in the casing halves and normally closed by the associated pawls 2 define detection holes, thereby providing an indication that the length of magnetic tape contained in the tape cassette should not be erased in any way.

The unique design of a pawl detecting mechanism provided in an analog audio deck requires that each of the pawls 2 serving as a detection surface must be flush with an upper face 14 of the respective casing half 1. As a matter of course, the presence of the pawls 2 in the tape cassette represents that information may be recorded on the length of magnetic tape contained therein.

If the pawls 2 are broken off from the tape cassette subsequent to the recording of an audio signal on the length of magnetic tape contained in the tape cassette of the type equipped with the erasure preventive pawls, an erroneous or premature erasure of the information recorded thereon can be avoided. However, the breakage of the two pawls 2 is complicated and time-consuming. If a subsequent recording of information on the length of magnetic tape in the tape cassette from which the pawls 2 have been broken off is desired, the associated recesses 3 exposed to the outside upon breakage of the pawls 2 must be covered up in any suitable manner, for example, by the use of an adhesive tape, requiring a complicated and time-consuming procedure.

The use of the erasure preventive pawls is not unique to audio tape cassettes, but is also employed in commercially available VHS video tape cassettes. In the VHS video tape cassettes, however, the detecting face of the erasure preventive pawl is somewhat set back inwardly of the video tape cassette and, therefore, if this design is applied to the audio tape cassette, the analog audio deck now in wide use will detect at all times that the tape cassette is no longer available for information recording.

More specifically, the condition in which the tape cassette is available for information recording means that the detecting face (represented by the pawl 2 shown in FIG. 6) must be in flush with the upper face 14 of the tape cassette.

SUMMARY OF THE INVENTION

An important object of the present invention is to eliminate the various problems inherent in the prior art tape cassettes such as discussed above and to provide an improved tape cassette with which an erasure preventing operation can easily be performed repeatedly.

The tape cassette designed to accomplish the foregoing object of the present invention has the following features. The tape cassette generally comprises a casing including first and second major walls opposite to each other and spaced a distance corresponding to the width of a length of magnetic tape, a pair of opposite end walls lying perpendicular to any one of the first and second major walls, and front and rear walls opposite to each other and lying perpendicular to any one of the first and second major walls and also to any one of the end walls, all assembled together to render the casing as a whole to represent a generally rectangular box-like configuration. While the front wall of the casing has an access opening defined therein for the access of at least one well-known magnetic recording and/or reproducing head assembly, a length of magnetic tape is accommodated within the casing with its opposite ends secured to hubs positioned adjacent the respective end walls while a portion of the magnetic tape between the hubs extends along the front wall so as to traverse the access opening. The tape cassette may be loaded into an information recording and/or reproducing apparatus with either the front wall or one of the end walls oriented towards the information recording and/or reproducing apparatus.

In this known design of the tape cassette, and in accordance with the present invention, the rear wall of the tape cassette is formed with at lest one detection hole opening outwardly in a direction perpendicular to the lengthwise direction of the tape cassette. An erroneous erasure preventing member is accommodated within the detection hole for selective movement between retracted and projected positions in a direction substantially perpendicular to the rear wall. The erasure preventing member has an outer surface which, when the erasure preventing member is held in the projected position, closes the detection hole while lying in flush with an outer surface of the rear wall, indicating the condition in which the length of magnetic tape contained in the tape cassette is available for information recording or erasure. This condition is hereinafter referred to as record-enabled condition of the tape cassette.

On the other hand, when the erasure preventing member is moved to the retracted position with the outer surface thereof consequently set back inwardly from the rear wall, the tape cassette is held in the condition in which neither information recording nor information erasure can be accomplished on or from the length of magnetic tape contained therein. This condition is hereinafter referred to as record-disabled condition of the tape cassette.

The tape cassette according to the present invention also comprises means for driving the erasure preventing member between the retracted and projected positions. This driving means is, according to a preferred embodiment of the present invention, comprised of an operating piece accommodated within an aperture, defined in at least one of the first and second major walls, for movement within the aperture and a linkage extending within the interior of the casing between the operating piece and the erasure preventing member.

Preferably, the aperture defined in at least one of the first and second major walls is in the form of a slot and opposite portions of the associated major wall adjacent respective ends of the slot are inwardly cut off.

Preferably, means is also provided for retaining the erasure preventing member at any one of the retracted and projected positions to thereby avoid any possible arbitrary movement of the erasure preventing member within the detection hole. This retaining means may comprise a detent projection.

Although not exclusively limited thereto, the operating piece is preferably so small that, for applying an external push or pull to the operating piece to move the erasure preventing member selectively between the retracted and projected positions, the application of the external push or pull requires the use of an external operating element such as, for example, a ball-point pen or the like. As described above, when and so long as the erasure preventing member is held at the projected position with the outer surface thereof held flush with the outer surface of the rear wall of the casing, the tape cassette is in the record-enabled condition. On the other hand, when the erasure preventing member is moved to the retracted position, the tape cassette is brought to the record-disabled condition.

Whether or not the tape cassette is in the record-enabled condition or in the record-disabled condition can be detected in any existing manner by means of the existing pawl detecting mechanisms. Thus, the existing pawl detecting mechanism generally employed in any other known information recording and/or reproducing apparatuses can be employed with the tape cassette designed according to the present invention without the slightest alteration being required.

The formation of the cut-off regions in the associated major wall of the casing adjacent the opposite ends the aperture or slot is advantageous in that access of the operating element, such as a ball-point pen to the operating piece can be facilitated when the operating piece is desired to be moved within the aperture or slot.

The employment of the detent projection ensures that the erasure preventing member can be firmly retained at any one of the retracted and projected position. Since a substantial force is required to move the erasure preventing member from the projected position towards the retracted position or from the retracted position towards the projected position, the tape cassette of the present invention is highly reliable in operation.

Also, since the erasure preventing member employed in the tape cassette of the present invention need not be broken off and can be repeatedly operated, the user of the tape cassette according to the present invention need not perform a remedy to cover up the recess once the erasure preventive pawl such as is employed in the prior art tape cassette has been broken off.

BRIEF DESCRIPTION OF THE DRAWINGS

The above and other objects and features of the present invention will become clear from the following description, taken in conjunction with preferred embodiments thereof and with reference to the accompanying drawings, in which like parts are designated by like reference numerals, and in which.

DETAILED DESCRIPTION OF THE EMBODIMENT

Although not shown, a tape cassette embodying the present invention is to be understood as comprising a casing including first and second major walls opposite to each other and spaced a distance corresponding to the width of a length of magnetic tape, a pair of opposite end walls lying perpendicular to any one of the first and second major walls, and front and rear walls opposite to each other and lying perpendicular to any one of the first and second major walls and also to any one of the end walls, all assembled together to render the casing as a whole to represent a generally rectangular box-like configuration. The front wall of the casing has an access opening defined therein for the access of at least one well-known magnetic recording and/or reproducing head assembly. A length of magnetic tape is accommodated within the casing with its opposite ends secured to hubs rotatably positioned adjacent the respective end walls while a portion of the magnetic tape between the hubs extends along the front wall so as to traverse the access opening.

The tape cassette may be loaded into any known information recording and/or reproducing apparatus with either the front wall or one of the end walls oriented towards the information recording and/or reproducing apparatus.

Figure 1:
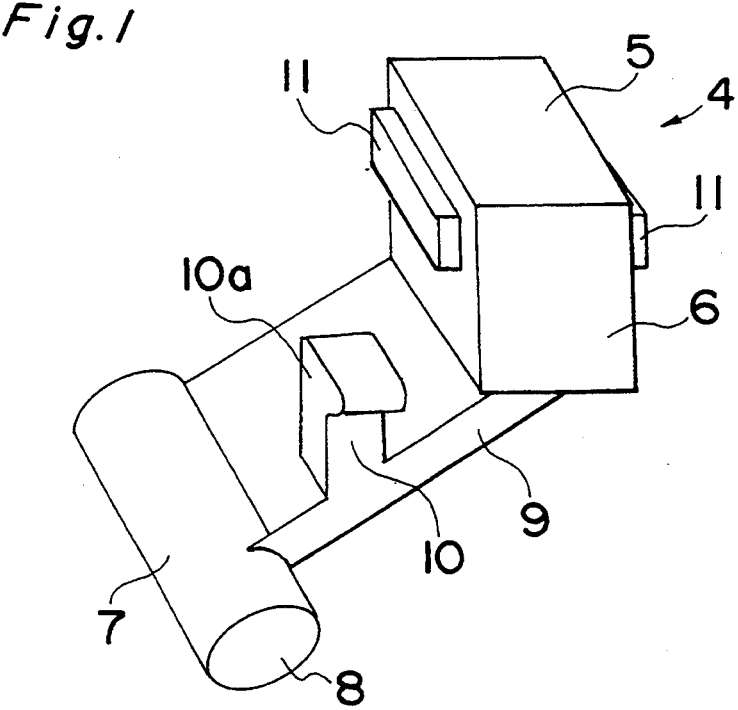
FIG. 1 is a schematic perspective view showing an erasure preventing mechanism employed in a tape cassette according to the present invention.
Figure 2:
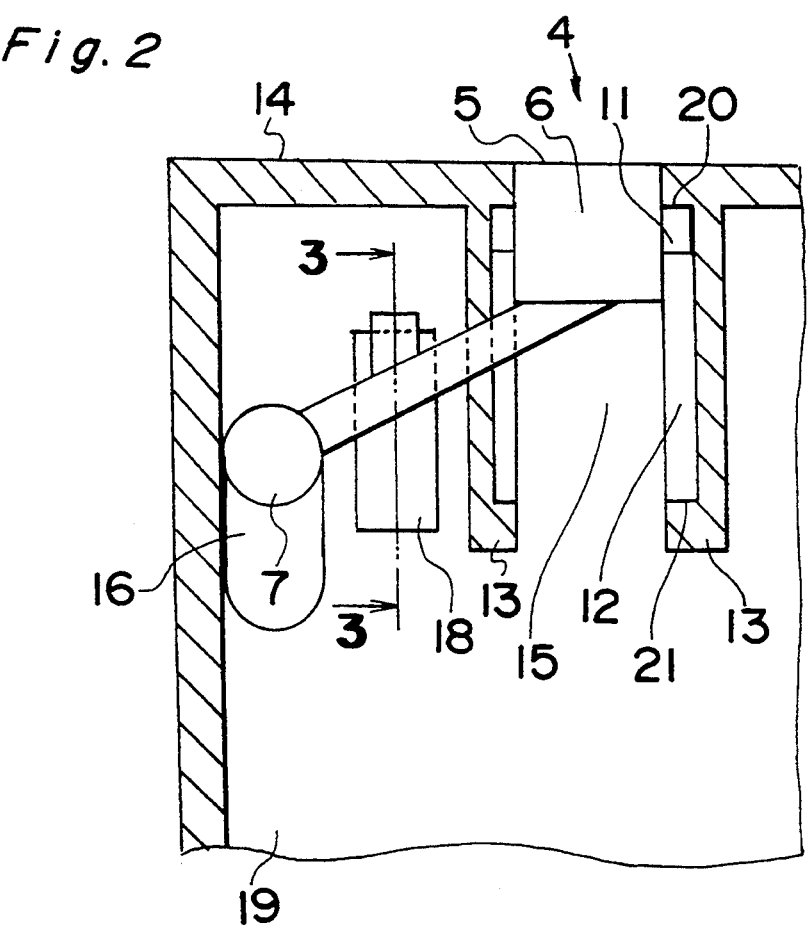
FIG. 2 is a fragmentary top sectional view showing a portion of the tape cassette in which the erasure preventing mechanism is accommodated.
Figure 3:
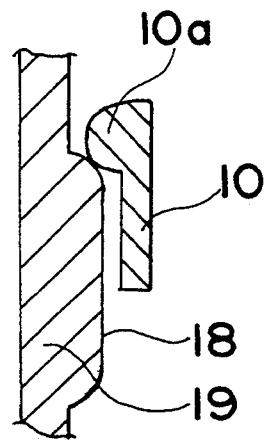
FIG. 3 is a cross-sectional view taken along the line 3—3 shown in FIG. 2.
Figure 4:
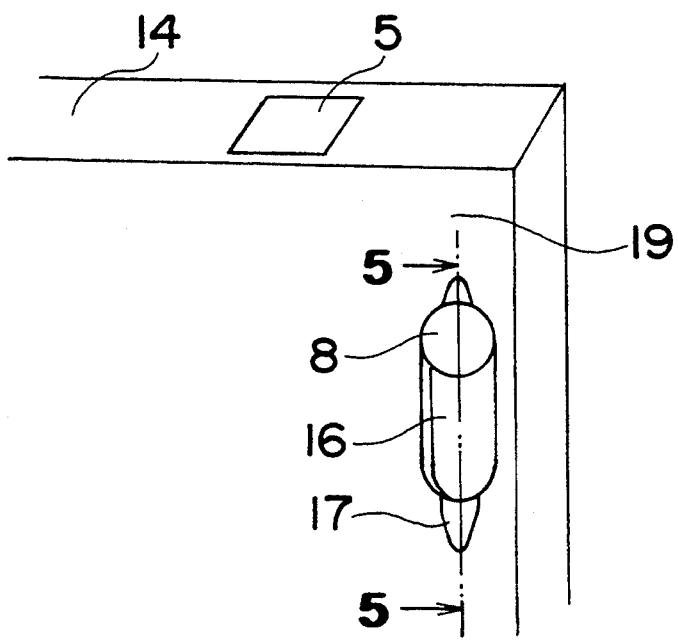
FIG. 4 is a schematic perspective view showing a portion of the erasure preventing mechanism according to the present invention.
Figure 6:
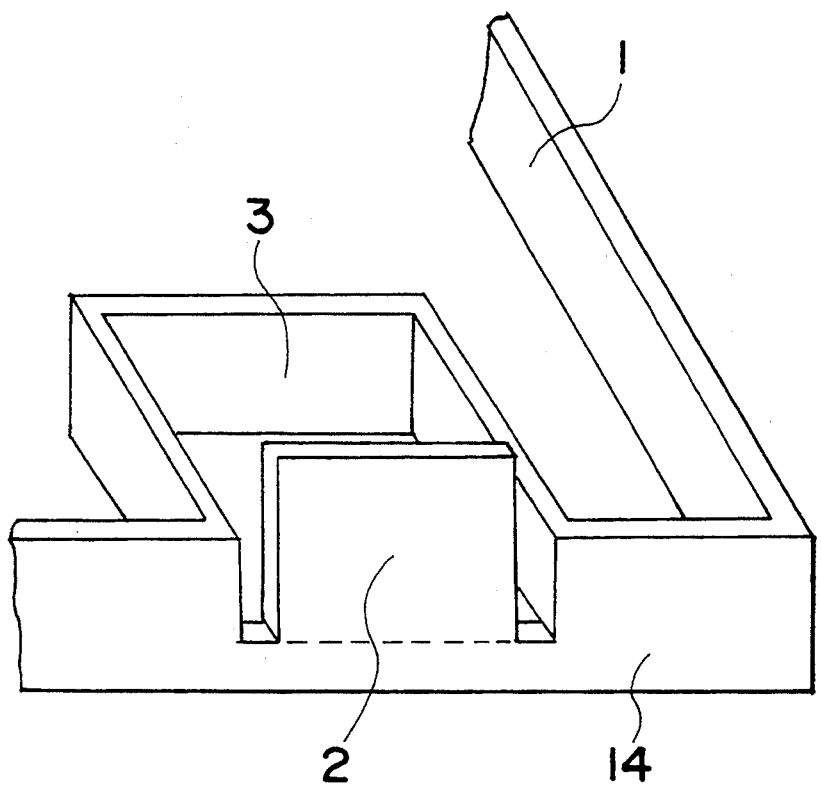
FIG. 6 is a schematic perspective view showing the prior art erasure preventing mechanism employed in the existing tape cassette.

Referring now to FIGS. 1 to 5, only a portion of the rear wall of the casing is identified by 14 in FIGS. 2 and 4. This rear wall 14 of the casing has a detection hole 15 defined therein at a position generally defined in any known tape cassette and delimited by a pair of guide walls 13 that extend inwardly of the casing. At least one of the first and second major walls, for example the first major wall shown by 19, has an aperture defined therein in the form of a slot 16 having a longitudinal axis thereof extending in the direction conforming to the direction of insertion of the tape cassette into the information recording and/or reproducing apparatus (not shown). This first major wall 19 has its inner surface formed with a detent projection 18 rigidly secured thereto, or otherwise integrally formed therewith, as best shown in FIG. 3, the size and the function of which will be described later.

As best shown in FIGS. 1 and 2, an erasure preventing member 4 is supported within the tape cassette for selective movement between retracted and projected positions in a direction perpendicular to the rear wall 14. This erasure preventing member 14 comprises a guide block 6 having a pair of guide wings 11 protruding laterally outwardly therefrom in respective directions opposite to each other and extending in a direction conforming to the direction of movement of the erasure preventing member 4 between the retracted and projected positions. This guide block 6 is movably accommodated within the detection hole 15 with the guide wings 11 slidably engaged in associated guide grooves 12 defined in the respective guide walls 13 such that the guide block 6 and, hence, the erasure preventing member 4 can move within the detection hole 15 selectively between the retracted and projected positions. It is to be noted that when the guide block 6 is held at the projected position as shown in FIG. 2, one of surfaces of the guide block which lies parallel to and adjacent to the rear wall 14, i.e., a detection face 5, is held flush with the outer surface of the rear wall 14, as is clearly shown in FIG. 2. This projected position for the guide block 6 may be defined by means of an abutment of the guide wings 11 with respective end walls 20 confronting the guide grooves 12 at a position adjacent the rear wall 14.

Operatively coupled with the guide block 6 is a generally cylindrical operating piece 7 connected, or otherwise integrally formed, with the guide block 6 by means of a linkage arm 9, as best shown in FIG. 1. This operating piece 7 has an operating face 8 exposed to the outside of the tape cassette through the slot 16 for access thereof to a user of the tape cassette, as will be described later. More specifically, with the guide block 6 movably accommodated within the detection hole 15, the cylindrical operating piece 7 has its longitudinal axis oriented perpendicular to any one of the first and second major walls and also has one of its opposite ends situated movably within the slot 16 with the operating face 8 exposed to the outside.

In the construction so far described, it will readily be understood that, when the erasure preventing member 4, held in the projected position as shown in FIG. 2, is moved towards the retracted position, a portion of the detection hole 15 adjacent the rear wall 14 defines a detection recess indicative of the absence of an erasure preventive pawl generally employed in the prior art tape cassette. Therefore, with the erasure preventing member 5 moved to the retracted position, the tape cassette embodying the present invention is in the record-disabled condition.

However, if by applying an external pushing force to the operating face 8 of the operating piece 7 with the aid of, for example, a ball-point pen the operating piece 7 is moved from one of the opposite ends of the slot 16, corresponding to the projected position of the guide block 6, to the other of the opposite ends of the slot 16, the guide block 6 is moved from the projected position towards the retracted position, leaving a detection recess as referred to hereinbefore. At this time, the guide wings 11 that are fast or integral with the guide block 6 are brought in toward respective end walls 21 defined in the guide walls 13 so as to confront the guide grooves 12 in opposition to the end walls 20 in the guide walls 13.

Figure 5:
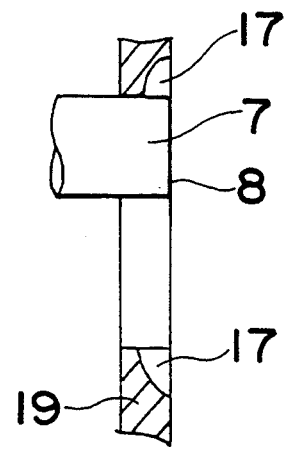
FIG. 5 is a cross-sectional view taken along the line 5—5 of FIG. 4.

The slot 16 is chosen to have a length substantially equal to the stroke of movement of the guide block 6 between the retracted and projected positions. To facilitate access to the operating face 8 of the operating piece 7, respective portions of an outer surface of the major wall 19, which are adjacent the opposite ends of the slot 6 are inwardly depressed to continue the slot 16, providing associated access cutouts 17, as best shown in FIGS. 4 and 5.

To minimize indentations occurring in the tape cassette, an end portion of the operating piece 17 which loosely protrudes into the slot 16 is chosen to have a length substantially equal to the thickness of the major wall 19 so that the operating face 8 may be flush with the outer surface of the major wall 19.

The detection face 5 of the guide block 6 is so shaped as to represent a rectangular or square shape in correspondence with the cross-sectional shape of the detection hole 15, and is sized so as to minimize any possible gap between the contour of the detection face 5 and the contour of the detection hole 15 open at the rear wall 14.

Means is also provided in the illustrated tape cassette for retaining the erasure preventing member at any one of the retracted and projected positions to thereby avoid any possible arbitrary movement of the erasure preventing member within the detection hole 15. This retaining means comprises, as best shown in FIGS. 1 to 3, a generally elongated detent projection 18 rigidly secured to, or otherwise formed integrally with, an inner surface of the major wall 19 so as to extend in a direction parallel to the longitudinal axis of the slot 13 or parallel to the direction of movement of the guide block 6, and a finger 10 integrally formed with the linkage arm 9 so as to protrude towards the major wall 19 for sliding contact with the detent projection 18. The length of the detent projection 18 is chosen to correspond to the stroke of movement of the guide block 6 between the retracted and projected positions such that, when and so long as the guide block 6 is held at any one of the retracted and projected positions, a detent protuberance 10a integral with the finger 10 engages a corresponding one of the opposite ends of the detent projection 18, as best shown in FIG. 3. When the guide block 6 is moved from one of the retracted and projected positions towards the other of the retracted and projected positions, the detent protuberance 10a slides over the detent projection 18, but is brought into engagement with the other of the opposite ends of the detent projection 18 when the guide block 6 arrives at the other of the retracted and projected positions.

The above described detent mechanism ensures that the operating piece 7 will not be erroneously moved unless a substantial force is applied thereto when the guide block 6 is desired to be moved.

Preferably, an erasure preventing mechanism is of one-piece construction including the guide block 6, the guide wings 11, the linkage arm 9 with the finger 10 and the operating piece 7 and is made of a hard synthetic resin such as, for example, polyacetal resin by the use of any known plastics molding technique.

Although the present invention has been described in connection with a preferred embodiment thereof with reference to the accompanying drawings, it is to be noted that various changes and modifications will be apparent to those skilled in the-art. For example, instead of the use of the guide block for the erasure preventing member, a rectangular or square plate may be employed.

Also, where a friction is given to the movement of the guide block, the retaining means, i.e., the combination of the detent projection and the finger having the detent protuberance, may not be essential. Similarly, the guide wings and the associated guide grooves are not always essential if the guide walls are so configured and so designed as to guide the guide block in sliding contact therewith.

Accordingly, such changes and modifications are to be understood as included within the scope of the present invention as defined by the appended claims, unless they depart therefrom.

What is claimed is:

1. A tape cassette for accommodating a length of magnetic tape therein, which comprises:

first and second major walls opposite to each other and spaced a distance corresponding to a width of the length of magnetic tape, a pair of opposite end walls perpendicular to any one of said first and second major walls, and front and rear walls opposite to each other and lying perpendicular to any one of said first and second major walls and also to any one of said end walls assembled together as a casing said front wall having an access opening defined therein for the access of a magnetic head assembly;

at least one of said first and second major walls having an aperture defined therein;

said rear wall having at least one detection hole therein opening outwardly of said casing;

an erroneous erasure preventing member accommodated within said detection hole for selective movement between retracted and projected positions in a direction substantially perpendicular to said rear wall, said erasure preventing member having an outer detection surface which, when said erasure preventing member is held in the projected position, closes said detection hole while lying flush with an outer surface of said rear wall; and an operating piece for driving the erasure preventing member between the retracted and projected positions accommodated with said aperture in said at least one of said first and second major walls for movement within said aperture and a linkage extending within said casing between said operating piece and said erasure preventing member.

2. The tape cassette as claimed in claim 1, wherein said aperture is a slot having a longitudinal axis, and wherein respective portions of an outer surface of said at least one of said first and second major walls adjacent opposite ends of said slot are inwardly depressed.

3. The tape cassette as claimed in claim 1, and further comprising means for retaining the erasure preventing member at any one of the retracted and projected positions to thereby prevent movement of the erasure preventing member within said detection hole.

4. The tape cassette as claimed in claim 3, wherein said means for retaining comprises a detent projection fixed in said casing and a finger on said linkage arm, said finger having a detent protuberance engaging said detent projection.

5. The tape cassette as claimed in claim 1, and further comprising a detent projection fixed in said casing and a finger on said linkage arm, said finger having a detent protuberance engaging said detent projection.

6. The tape cassette as claimed in claim 1, wherein said aperture is an elongated slot extending in the direction substantially perpendicular to said rear wall.

7. The tape cassette as claimed in claim 6, wherein said at least one of said first and second major walls, having said aperture therein, has indentations therein at opposite ends of said elongated slot.

8. The tape cassette as claimed in claim 6, and further comprising a detent projection fixed in said casing and a finger on said linkage arm, said finger having a detent protuberance engaging said detent projection.

9. The tape cassette as claimed in claim 8, wherein said detent projection extends in the direction substantially perpendicular to said rear wall.

* * * * *